Patented Dec. 27, 1938

2,141,198

UNITED STATES PATENT OFFICE 2,141,198

LIGHT - COLORED HIGH - MELTING - POINT RESIN ADAPTED FOR VARNISH MAKING AND PROCESS OF MAKING SAME AND COATING COMPOSITIONS THEREFROM

John B. Rust, Orange, N. J., assignor to Ellis-Foster Company, a corporation of New Jersey No Drawing. Application March 5, 1936,
Serial No. 67,302

20 Claims. (Cl. 260—4)

The present invention relates to high-melting, oil-soluble phenolic-aldehyde resins and a process of making them, having as a primary aim the production of resins capable of yielding rapid drying, resistant oil varnishes.

When formaldehyde is reacted with cresols, resins result which are liquid or solid depending upon the proportions of the reactants and the type of catalyst used to effect condensation. Furthermore, the solid resins may be made low or high melting also depending upon the above conditions. Such resins, even the soft type, are not in general soluble in fatty glyceride oils such as linseed or tung oil. They may be rendered soluble, however, by fusion with natural resins, such as rosin, or by treatment of the resin with small amounts of some fatty oil. The same also obtains possibly with some slight variations with formaldehyde-cresylic acid resins.

Introduction of natural resins into phenolic-aldehyde resin varnishes reduces to a certain extent the excellent properties of water, alkali, acid and weathering resistance possessed by the latter and imparted to oil varnishes when cooked with drying oils. Therefore it is desirable and advantageous to employ in drying oil varnishes phenolic resins which have not been modified with natural resins, or by other means. Phenolic-formaldehyde resins which are in themselves oil-soluble may be prepared from phenols having some type of hydrocarbon side chain containing two or more carbon atoms, such as butyl phenol, amyl phenol, hydroxy-diphenyl and the like. In general, the fewer the number of carbon atoms in the phenolic side chain, the less soluble the resin becomes in drying oil. Position of the side chain with respect to the phenolic hydroxyl also may possibly have some effect on the drying oil-solubility of the resins.

From the standpoint of availability and price, the simple phenols such as phenol, cresol and cresylic acid are to be preferred as raw materials for resin fabrication. In my copending application Serial 39,621, I have described an oil soluble resin of cresol, or cresol mixtures and the like and acetaldehyde, which is light in color and relatively simple to manufacture. It possesses the advantage of cheapness since it is made from the simple, readily available phenols and is easily soluble in all of the drying oils, producing light-colored varnishes, paints or enamels. Furthermore the resin is extremely light in color when the starting materials are light-colored. The pale color of the resins is caused by a remarkable phenomenon termed heat-bleaching, the resin being very dark-colored immediately after resinification with the aldehyde but is bleached merely by heating it above a certain critical temperature, usually from 180° to 200° C. It was found that oxalic acid caused this heat-bleaching when used to catalyze the phenol-aldehyde reaction.

It has now been found that certain combinations of oxalic acid or acid and neutral oxalates, and other acid condensing agents may be employed to yield light-colored, oil-soluble resins, the resin possessing the added advantage of extremely high melting point and excellent yield.

The present invention therefore relates to oil-soluble phenolic-acetaldehyde resins made from the simple phenols, such as cresol or cresylic acid, and acetaldehyde or its polymers in the presence of a composite catalyst comprising oxalic acid and another acid condensing agent, said resin being characterized by its relatively high melting point and its property of heat-bleaching from a substantially dark-colored resin to a substantially light-colored resin when heated above 180° C.

In this invention the bleaching-catalyst is preferably oxalic acid or an equivalent compound such as ethyl oxalate and the auxiliary-catalyst any other acid condensing agent, preferably hydrochloric acid. However, other auxiliary catalysts such as sulphuric, o-phosphoric, trichloracetic, sulphurous, toluenesulphonic, or alkyl-substituted sulphuric acid may be employed. I prefer to use hydrochloric acid, since in general it yields higher-melting and lighter colored resins when used in conjunction with the bleaching catalyst than do the other enumerated inherently color-forming auxiliary catalysts.

When the term bleaching-catalyst is used, it is to be understood that oxalic acid or its equivalent compounds capable of bringing about heat-bleaching when the substantially dark, freshly-resinified resin is heated above 180° C. is indicated. The term auxiliary-catalyst is used to denote any other inherently color-forming acid condensing agent used in conjunction with the bleaching-catalyst either for the purpose of accelerating the resin reaction or to replace a part of the bleaching-catalyst.

Thus, the process of the present invention comprises reacting a simple phenol with acetaldehyde or paraldehyde in the presence of a bleaching- and inherently color-forming auxiliary-catalyst to form a resin readily soluble in drying oils and having the property of heat-bleaching from a substantially dark color to a substantially light color when heated above 180° C.

It is desirable to obtain resins in good yield, that is, the ratio of final resin to original phenol should be as high as possible. Therefore I prefer to use as the inherently color-forming auxiliary-catalyst a strong acid. When strong acids are employed the resins in general possess relatively high melting points, for instance from 140° to 160° C.

In some cases when large amounts of formaldehyde are used to secure high-melting, oil-soluble phenolic-formaldehyde resins, the drying oil varnishes made from them have a tendency to gelatinize and thicken upon standing. Correctly cooked, drying oil-varnishes made from the high-melting resins of the present invention do not have this fault and show no apparent viscosity increase upon storage. This fact illustrates one difference between formaldehyde and acetaldehyde. Although acetaldehyde is an aldehyde similar chemically to formaldehyde and described in the literature as the obvious equivalent of formaldehyde, it reacts in a distinctly different manner from the latter. Acetaldehyde or paraldehyde is particularly suitable for the production of fatty oil-soluble resins when reacted with the simple phenols, such as ortho, meta, or para cresol, mixed cresols, cresylic acid and the like. Although, in general, dark-colored resins result, resins extremely light in color may be secured as described in my copending application, Serial 39,621. Heat-bleaching to form substantially light-colored resins from substantially dark-colored resins also takes place in the process of the present invention and is brought about through the function of the bleaching-catalyst. The inherently color-forming auxiliary catalyst serves the purpose of effecting a rapid and complete combination of the acetaldehyde or paraldehyde with the phenol securing excellent yields of relatively high-melting resin. When I use the term relatively high-melting resins, I mean resins having softening points as determined by the "ball and ring" method of over 120° C. and generally between 130° C. and 160° C. or higher.

The high-melting resins of the present invention are characterized by their ready solubility in all drying oils, a fact which is not generally true of high-melting phenolic-formaldehyde resins. Furthermore the resins are very reactive with drying oils when cooked with the latter, yielding varnishes which are rapid drying and exhibit a remarkable resistance to water, acids and alkalies.

Since the resins of the present invention are pale colored, being, if the bleaching catalyst is present in substantial quantity, about as light as WW rosin, the varnishes made therefrom are correspondingly light-colored and dry rapidly with the formation of tough, hard, light-colored films. In view of these facts light-colored enamels may be made from the varnishes by grinding, or mixing them with appropriate pigments. Even pure whites or delicately tinted pigments may be used since there is substantially no after-yellowing in the dried film and such whites or tints are preserved in the hard coating. The oil-resin compositions of this invention may also be used as facing for decorative oiled cloth or as waterproofing agents for fabrics designed for use as raincoats, shower curtains, and the like.

It has been stated above that the resins of the present invention are light-colored due to the heat-bleaching phenomenon described herein and also in my copending application Serial 39,621. The resins of the latter invention are extremely pale in color, being almost water-white, or substantially colorless, the color being mainly governed by the color of the original phenol. The resins of the present invention are also light-colored, but the color is governed by three factors, namely, the proportion of bleaching-catalyst, the proportion of inherently color-forming auxiliary-catalyst and the original color of the phenol. Thus, darker resins result if the amount of bleaching-catalyst is small and the amount of auxiliary-catalyst is high than if the amount of bleaching-catalyst is high and the auxiliary catalyst low. However, all of the resins made with some proportion of bleaching-catalyst, however small, exhibit heat-bleaching when heated above 180° C., but as the amount of bleaching catalyst is decreased the color of the final resin approaches the very dark color of phenolic-acetaldehyde resins made in the usual manner without bleaching-catalyst. It is preferable, therefore, to use from 5% to 10% bleaching-catalyst based on the phenol in order to secure very pale-colored resins.

Instead of employing one inherently color-forming auxiliary-catalyst I may use a plurality of catalysts in conjunction with oxalic acid, as for example a mixture of hydrochloric and sulphuric acids, hydrochloric and o-phosphoric acids or hydrochloric and trichloracetic acids.

The following are examples given to better illustrate the process and products of the present invention; all proportions are in parts by weight.

*Example 1.*—54 parts of a commercial mixture of meta and para cresols are mixed with 30 parts of paraldehyde, 5 parts of oxalic acid, 50 parts of water and 15 parts of 35% aqueous hydrochloric acid solution. The mixture is well agitated, then heated under a reflux condenser at boiling for about 7½ hours. A soft, sticky resinous product is precipitated in about 1½ to 2 hours and, as heating is continued, becomes progessively harder and darker until it sets almost solid at 100° C. at the end of 7½ hours. This dark resinous mass is washed thoroughly in boiling water to remove as much acid as possible, then it is heated carefully up to 220°–230° C. During the heating at about 190°–200° C. heat-bleaching occurs and the dark material changes to a light-brown resin. At room temperature it is solid and brittle.

In the preceding example all of the constituents were mixed together without regard to order of addition of the components. However, it has been found that lighter colored resins result if the bleaching-catalyst is first dissolved in the phenolic component and the other constituents added later. The auxiliary-catalyst is preferably added last.

*Example 2.*—54 parts of a commercial mixture of meta and para cresols, 30 parts of paraldehyde and 1 part of oxalic acid are mixed and agitated until substantially all of the oxalic acid has dissolved and a clear solution results. Then 15 parts of 35% aqueous hydrochloric acid dissolved in 50 parts of water is added to the phenolic-aldehyde solution and the mixture heated at boiling under a reflux condenser for about 5 hours. The resinous material which precipitates is very dark and will just soften in boiling water. It is washed in boiling water, then heated carefully up to 220°–230° C. During heating, at about 200° C., the molten resin bleaches from its original dark color to a pale amber. At room temperature the resin is solid and brittle.

Paraldehyde is, in general, easier to handle under atmospheric pressure and relatively high temperatures than is acetaldehyde. However, if a pressure apparatus or some type of closed system is employed to prevent the loss of acetaldehyde by volatilization, the latter may be used as the resinifying agent in place of paraldehyde. An efficient type of condensing system must be used at atmospheric pressure in an open system.

On the other hand, gaseous acetaldehyde or paraldehyde may be employed instead of the liquid aldehyde. In this case the gas may be passed directly into the phenolic reaction mixture in the substantially pure state, or in admixture with other gases as, for example, ethylene, ethane, methane or illuminating gas and the like.

Example 3.—54 parts of a commercial mixture of meta and para cresols are mixed with 1 part of oxalic acid and warmed until the oxalic acid has dissolved to form a clear solution. 30 parts of acetaldehyde are dissolved in 50 parts of water and 15 parts of 35% aqueous hydrochloric acid solution added slowly with constant stirring. The acetaldehyde-acid solution is then added to the cresol-oxalic acid solution and the mixture heated at boiling under a reflux condenser for 6 hours. The reflux condenser is of the bulb type in order to provide a large condensing area for the gaseous acetaldehyde. In 6 hours the resinous product which precipitates sets to a dark solid at 90°–100° C. This solid is removed and washed thoroughly with water. It is then heated carefully up to 210° C. During heating the material is bleached at about 190° C., changing from a dark mass to a light-colored resin. At room temperature it is hard and brittle.

Although cresol or cresol mixtures are the preferred phenolic materials of the present invention, cresylic acid, or mixtures of cresols and xylenols may be employed to yield an oil-soluble resin. Phenol cannot be used alone since the resulting resin is relatively oil-insoluble. However, mixtures of phenol and cresol, or phenol and cresylic acid, give drying oil-soluble resinous materials, the proportion of phenol being kept preferably low.

Example 4.—540 parts of a commercial grade of 99% straw-colored cresylic acid are mixed with 300 parts of paraldehyde and 10 parts of oxalic acid. The mixture is warmed until all of the oxalic acid has dissolved yielding a clear solution. 100 parts of 35% aqueous hydrochloric acid solution are dissolved in 500 parts of water and the solution added to the cresylic acid-aldehyde-oxalic acid solution. The mixture is well agitated and then heated at boiling under a reflux condenser for about 12 hours. In this time a hard, dark resinous material forms which is washed with boiling water, then heated carefully up to 220° C. During heating a bleaching is observed and the near-black original resin becomes a light red-brown at about 200° C.

Example 5.—54 parts of ortho cresol are mixed with 30 parts of paraldehyde and 1 part of oxalic acid, and warmed until the oxalic acid has dissolved to form a clear solution. 15 parts of 35% aqueous hydrochloric acid solution are dissolved in 50 parts of water and added to the cresol-paraldehyde-oxalic acid solution. The mixture is agitated and heated to boiling under a reflux condenser for about 6 hours. A dark hard brittle resin results which is washed in boiling water to remove excess acid, then heated carefully up to 210° C. During heating, bleaching occurs and the final resin at ordinary temperature is hard and brittle.

In general it is preferable to add water to the reaction mixture in order to moderate the activity of the reaction. However, this is not necessary if care is exercised when introducing the auxiliary-catalyst.

Example 6.—54 parts of a commercial mixture of meta and para cresols are mixed with 30 parts of paraldehyde and 1 part of oxalic acid and warmed until the oxalic acid has dissolved to form a clear solution. 10 parts of a 35% aqueous hydrochloric acid solution are then carefully added to the mixture under a reflux condenser. An exothermic reaction begins as the first part of the hydrochloric acid is introduced. This is allowed to subside before the next part is added. When all of the hydrochloric acid has been added external heat is applied and the reaction mixture boiled under a reflux condenser until it has set to a solid. A very dark almost black resinous product results which is washed with water, then heated carefully up to 230° C. During heating, a bleaching is observed with the formation of a fairly light-colored molten resin. At room temperature the resin is hard, brittle and somewhat darker than WW rosin. It is darker than the resin of Example 2, being red-yellow in color, rather than pale yellow.

Although larger and smaller amounts of paraldehyde than those indicated may be employed, 1.5 moles to 2 moles of acetaldehyde per one mole of the phenol is a good proportion for the production of high-melting oil-soluble phenolic-acetaldehyde resin. The following examples use one mole and two moles of acetaldehyde, respectively, per one mole of cresol.

Example 7.—54 parts of a commercial mixture of meta and para cresols are mixed with 22 parts of paraldehyde and 1 part of oxalic acid. The mixture is warmed gently until the oxalic acid dissolves. 65 parts of an 8% aqueous hydrochloric acid solution are added and the mixture heated at boiling under a reflux condenser for 4 hours. In this time a dark-colored resin is precipitated which is washed thoroughly, then heated to 220° C. Heat-bleaching occurs at about 190° C. resulting in a pale-colored molten resin. At room temperature the resin is hard and brittle.

Example 8.—54 parts of a commercial mixture of meta and para cresols are mixed with 44 parts of paraldehyde and 1 part of oxalic acid. When the oxalic acid has been dissolved by warming, 65 parts of an 8% aqueous hydrochloric acid solution are added and the mixture heated under a reflux condenser for 4 hours. In this time a soft light-colored resin forms. If refluxing is carried out for 4¾ hours additional the reaction mixture sets to a dark, hard resin at 100° C. This is washed with water, then heated to 260° C. Heat-bleaching takes place at 200° C. to yield a resin lighter in color than that of Example 7. However, the resin foams considerably and should be heated to 260° C. until the foaming has ceased.

Although heating substantially above the heat-bleaching temperature is in general undesirable since redarkening of the resin is liable to take place due to air oxidation, in some cases it is preferable to heat to 250° C. or higher to eliminate all of the volatile constituents. An inert atmosphere may be used if desired.

To obtain very light-colored resins it is preferable to employ substantial catalytic quantities of bleaching-catalyst. However, small amounts, for instance 0.18% based on the phenol, can be used and yet secure heat-bleached resins which are suitable for light-colored varnish solutions, although the color change is not as great as when from 5% to 10% oxalic acid is employed.

*Example 9.*—54 parts of a commercial mixture of meta and para cresols are mixed with 30 parts of paraldehyde and 0.1 part of oxalic acid. The mixture is warmed, then 65 parts of an 8% aqueous hydrochloric acid solution added. The directions of Example 7 are followed and a hard, brittle, fairly light-colored resin is obtained.

In some cases it is not desirable to have resins of extremely high melting point, although it is preferable to retain the excellent characteristics of such resins. It is therefore another aspect of this invention to provide lower melting resins which have been plasticized by the addition of tung or linseed oil to the original reaction mixtures.

*Example 10.*—54 parts of a commercial mixture of meta and para cresols, 30 parts of paraldehyde, 10 parts of raw tung oil, and 1 part of oxalic acid are warmed until the oxalic acid has dissolved. 65 parts of an 8% aqueous hydrochloric acid solution are added and the directions of Example 7 followed. The final resin is hard, brittle and light in color.

*Example 11.*—54 parts of a commercial mixture of meta and para cresols, 30 parts of paraldehyde, 10 parts of linseed oil which has been bodied by heating at 300° C. for 2½ hours, and 1 part of oxalic acid are mixed and warmed until the oxalic acid has dissolved, then 65 parts of an 8% aqueous hydrochloric acid solution added. The directions of Example 7 are followed, the final resin being hard, brittle and cloudy. However, when cooked with additional drying oil to form a varnish this cloudiness disappears.

Oxalates, such as ethyl oxalate, or inorganic oxalates may be employed as bleaching catalysts in place of oxalic acid. In general they do not catalyze the condensation, but merely serve as a bleaching-catalyst to yield light-colored resins.

*Example 12.*—54 parts of a commercial mixture of meta and para cresol are mixed thoroughly with 30 parts of paraldehyde and 5 parts of ethyl oxalate. 64 parts of an 8% aqueous solution of hydrochloric acid are added and the mixture heated to boiling under a reflux condenser for 6½ hours. In this time a solid, very dark colored resin is produced. It is washed thoroughly with boiling water, and then heated to 215° C. During heating a very marked bleaching takes place and a pale-colored resin results which at room temperature is hard and brittle. It has a softening point of about 163° C.

Besides the simple phenols I may also use condensation products of the simple phenols and aldehydes and ketones, as for example diphenylol butane and dicresylol propane, formed by reacting phenol and butyraldehyde, and cresol and acetone, respectively, in an acid medium.

*Example 13.*—216 parts of a commercial mixture of meta and para cresols are mixed with 72 parts of butyraldehyde and 6 parts of a 35% aqueous hydrochloric acid solution added. The mixture is allowed to react at room temperature to form a viscous liquid condensation product. 135 parts of this condensation product are mixed with 33 parts of paraldehyde and 7 parts of oxalic acid and warmed until a clear solution results. 100 parts of a 10% aqueous hydrochloric acid solution are added and the mixture heated to boiling under a reflux condenser for 5½ hours. The hard, dark-colored resin which forms is washed with water, then heated up to 220° C. During heating considerable bleaching occurs resulting in a very light-colored molten resin which possesses a high melting point. At room temperature it is hard, brittle and amber colored.

In general, as stated above, I prefer to use hydrochloric acid, hydrobromic acid and the like as inherently color-forming auxiliary catalysts. However, other acids, such as nitric, sulphuric, phosphoric, trichloracetic and toluenesulphonic may be employed if desired. In the following example toluenesulphonic acid is used.

*Example 14.*—54 parts of a commercial mixture of meta and para cresol are mixed with 25 parts of paraldehyde and 5 parts of oxalic acid. The mixture is warmed to dissolve the oxalic acid, then 20 parts of a 50% aqueous solution of toluenesulphonic acid are added. The mixture is refluxed for 8 hours, the resulting product washed with water, and heated above 180° C. to harden, heat-bleach and dehydrate.

In Table 1 will be found the characteristics of the resins described in the above examples. Of course some variation will be noted, but the resins are characterized by their high melting point and lightness in color. The resins of the present invention are of higher melting point than heretofore encountered with oil-soluble resins. All of the resins are soluble in drying oils and further, have the property of hardening to infusible films upon protracted baking at 170° C.

*Table 1.—Resins*

| Example | Phenol | Aldehyde | Bleaching-catalyst | Auxiliary-catalyst | Melting point °C. | Acid number |
|---|---|---|---|---|---|---|
| 1 | Meta-paracresol, 1 mole. | Paraldehyde, 1.36 moles. | Oxalic acid 9.2% of phenol. | Hydrochloric acid, 9.7% of phenol. | 140 | 90 |
| 2 | ----do---- | ----do---- | Oxalic acid, 1.8% of phenol. | ----do---- | 146 | 91 |
| 3 | ----do---- | Acetaldehyde, 1.36 moles. | ----do---- | ----do---- | 152 | 90 |
| 4 | Cresylic acid, 1 mole (average). | Paraldehyde, 1.36 moles. | Oxalic acid, 1.7% of phenol. | Hydrochloric acid, 9.2% of phenol. | 118 | 83 |
| 5 | Orthocresol, 1 mole. | ----do---- | Oxalic acid, 1.8% of phenol. | Hydrochloric acid, 9.7% of phenol. | 127 | 70 |
| 6 | Meta-paracresol, 1 mole. | ----do---- | ----do---- | Hydrochloric acid, 6.5% of phenol. | 146 | 75 |
| 7 | ----do---- | Paraldehyde, 1 mole. | ----do---- | Hydrochloric acid, 9.7% of phenol. | 148 | 68 |
| 8 | Meta-paracresol. | Paraldehyde, 2 moles. | ----do---- | ----do---- | 158 | 59 |
| 9 | Meta-paracresol, 1 mole. | Paraldehyde, 1.36 moles. | Oxalic acid, 0.18% of phenol. | ----do---- | 154 | 85 |
| 10 | Meta-paracresol, 1 mole containing 18.8% tung oil. | ----do---- | Oxalic acid, 1.8% of phenol. | ----do---- | 131 | 90 |
| 11 | Meta-paracresol, 1 mole containing 18.8% linseed oil. | ----do---- | ----do---- | ----do---- | 134 | 90 |

To illustrate better the color difference of the resins of the present invention and resins made with no bleaching catalyst, the color of a 50% solution of the resins in a neutral, colorless solvent is expressed in Lovibond units. For instance, the resin of Example 2 has a color of 22Y and 2.7R, that of Example 7 a color of 22.1Y and 9.9R, while that of WW rosin is 9.2Y and 1.4R. A resin made identical to that of Example 2, but with the bleaching catalyst omitted, in 50% solution of cellosolve, is too dark to be measured in the same color range, but a 25% solution in cellosolve has a color of 28Y and 5.7R. Thus, the resins of the present invention in general are slightly darker than WW rosin, but very much lighter than similar phenolic-acetaldehyde resins made without bleaching catalyst. As described in my copending application Serial 39,621, the resins of that invention are as light as, or substantially lighter than WW rosin. In other words, the resins have been made in the presence of only the bleaching catalyst and no inherently color-forming auxiliary-catalyst has been used. For example, the resin described in Example 9 of that application in a 50% cellosolve solution has a color of 2.3Y and 0.3R in Lovibond units.

Although the auxiliary-catalyst has a considerable darkening effect on the resin, it contributes materially to the per cent yield and hardness of the resins and furthermore, the resins are pale colored, being only slightly darker than WW rosin but very much lighter in color than a resin made with no bleaching-catalyst. Thus, the proportion of bleaching- and auxiliary-catalyst governs the color of the final resin, it being very pale in color when the bleaching-catalyst is present in substantial amounts.

The following examples are illustrative of the varnish compositions made with the resins of the present invention and drying oils. Enamels may be obtained from the varnishes by grinding them with, or dispersing in them, pigments and dyes. They may be used with or without driers and may also be employed in water-proofing and impregnation. The drying compositions are ideally suited for protective coatings because of their rapid drying with a relatively small amount of drier, and their excellent water, weathering and chemical resistance.

*Example 15.*—One part of the resin described in Example 2 is mixed with 2 parts of raw tung oil and the mixture heated up to 270° C. over a period of 8 minutes. The temperature is held at 270° C. for 6 minutes, then the mixture is cooled, thinned with 1½ parts xylol and 1½ parts cellosolve and 2% (calculated on the varnish base) of lead-cobalt-manganese naphthenate drier solution added. The varnish is light in color and has about the correct viscosity.

*Example 16.*—One part of the resin described in Example 3 is mixed with 2 parts of raw tung oil and heated up to 270° C. over a period of 6 minutes. The temperature is held at 270° C. for 9 minutes, then the varnish base is cooled, thinned with a 1:1 mixture of V. M. & P. naphtha and a hydrogenated solvent known to the trade as Solvesso #2 and 2% (calculated on the varnish base) of lead-cobalt-manganese naphthenate drier solution added. The varnish has about the same color and viscosity as that of Example 14.

*Example 17.*—One part of the resin described in Example 4 is mixed with 2 parts of raw tung oil and heated up to 270° C. over a period of 7 minutes, held at 270° C. for 8 minutes, then cooled. The varnish base is light-colored and may be thinned with 3 parts of V. M. & P. naphtha to form a clear varnish. 2% (calculated on the varnish base) of lead-cobalt-manganese naphthenate drier solution are added.

*Example 18.*—One part of the resin of Example 7 is added to 2 parts of raw tung oil and the mixture heated up to 270° C. over a period of 8 minutes. The temperature is held at 270° C. for 8 minutes, then the light-colored varnish base is cooled. It is thinned with 1.5 parts of V. M. & P. naphtha and 1.5 parts of a hydrogenated solvent such as that known to the trade as Solvesso #2. 2% (calculated on the varnish base) of lead-cobalt-manganese naphthenate drier solution may be added if desired.

*Example 19.*—One part of the resin described in Example 10 is added to 2 parts of raw tung oil and the mixture heated up to 270° C. over a period of 10 minutes, held at 270° C. for 7 minutes, then cooled. The varnish base is thinned with the same solvent as is used in Example 17, and the same amount of drier added.

*Example 20.*—15 parts of the resin described in Example 11 are added to 10 parts of linseed oil, which has previously been bodied by heating at 300° C. for 2½ hours, and 12½ parts of raw tung oil. The mixture is heated up to 270° C. over a period of 7 minutes, held at 270° C. for 8 minutes, then cooled. The cloudiness which first appears in the oil-resin mixture disappears when the temperature reaches 210° C. and a clear varnish base results. This may be thinned with 37 parts of a hydrogenated solvent such as Solvesso #2 and metallic naphthenate driers added if desired.

*Example 21.*—20 parts of the resin described in Example 12 are heated with 40 parts of raw tung oil up to 270° C. over a period of 9 minutes, held at 270° C. for 6 minutes, then cooled. The light-colored varnish base is thinned with 35 parts of V. M. & P. naphtha and 25 parts of a hydrosolvent such as Solvesso 1. Two parts of a 33⅓% lead-cobalt naphthenate drier solution in V. M. & P. naphtha may be added if rapid drying is required of the varnish.

The characteristics for the above varnishes will be found in Table 2. In general they exhibit a marked resistance to chemical influences and weathering as well as possessing excellent water resistance.

The varnishes all contain the same proportion of naphthenate driers, namely, 0.0051 part of lead calculated as the metal, 0.00027 part of cobalt metal and 0.00027 part of manganese metal. As a comparison to the colors given in the last column an ester gum varnish made in a similar manner to the varnishes of Examples 12 through 16 inclusive, had a color of 29.8Y and 5.5R in Lovibond units.

The resins, besides being especially adapted for drying-oil varnishes, may also be employed in molding compositions since they harden very rapidly with small amounts of accelerators such as hexamethylenetetramine, paraformaldehyde or similar reactive compounds. Furthermore the resins may be used, with or without plasticizers, in lacquers or in conjunction with cellulose nitrate, with which they are compatible.

Table 2.—Varnishes

| Example | Resin | Tung oil (raw) Parts | Bodied linseed oil Parts | Drying time Hours | 5% NaOH resistance at 70° F. | Boiling water resistance | Color in Lovibond units (50% thinner) |
|---|---|---|---|---|---|---|---|
| 15 | 1 part resin #2 | 2 | | 4 | Does not whiten on 48 hrs. immersion. | O. K. after 96 hrs. No whitening. Good gloss. Slightly blistered. | 20Y 2.5R |
| 16 | 1 part resin #3 | 2 | | 4 | ...do... | ...do... | 29.9Y 9.9R |
| 17 | 1 part resin #4 | 2 | | 5 | ...do... | O. K. after 96 hrs. No whitening. Good gloss Blistered. | |
| 18 | 1 part resin #7 | 2 | | 4 | ...do... | O. K. after 96 hrs. No whitening. Good gloss. Very slightly blistered. | 21.0Y 3.5R |
| 19 | 1 part resin #10 | 2 | | 4½ | ...do... | O. K. after 96 hrs. No whitening Good gloss. Slightly blistered. | 29.9Y 7.3R |
| 20 | 1 part resin #11 | 9/10 | ⅔ | 4½ | Permanently whitens on 13 hrs. immersion. | O. K. after 96 hrs. No whitening. Excellent gloss. Slightly blistered. | 29.9Y 9.1R |

Thin films of the high-melting resins of the present invention may be rendered infusible by protracted baking in an oven at 160° C. The oil-varnishes which are made with these resins may also be hardened by baking with or without metallic driers. The driers may be added in the form of the soluble soaps, or, if desired, they may be cooked directly into the oil-resin mixture.

As has been stated above, the resins of the present invention are very high melting in general possessing softening-points of above 120° C. and in some cases as high as 160-165° C. Acetaldehyde-phenolic resins heretofore described possess rather low melting points. In the literature softening points of 75°-95° C. have been mentioned and in another case it is stated that phenolic-acetaldehyde resins become liquid at 50°-80° C. The resins of the present invention therefore appear to be distinct from the previously described low-melting resins.

Furthermore, the proportion of drying oil to resin is not limited but may vary to suit the requirements of the varnish or enamel. As the drying oil constituent I may employ tung, oiticica, linseed, perilla, soy bean oil and the like or mixtures of these oils. I may also use the glyceride of dehydrated castor oil acids. Some types of oils or oil mixtures are more suitable in specialized varnishes than others and may be selected accordingly.

The resins of the present invention are in general readily soluble in all drying oils and may be used in all types of varnishes.

Although this invention specifically relates to the simple phenols, and condensation products of the simple phenols and aldehydes and ketones, I may also use other phenols, such as p-tert.-amyl phenol, tert.-butyl phenol, resorcinol, hexyl phenol and the like or mixtures of these phenols and the simple phenols. As the resinifying agent I can also employ mixtures of acetaldehyde and formaldehyde or acetaldehyde and butyraldehyde, or acetaldehyde and some higher aldehyde capable of reacting with phenols. The proportion of these other aldehydes, however, is preferably kept low since in some cases they tend to lower the melting point of the resins, or on the other hand cause the resins to become infusible at comparatively low temperatures.

If desired the high-melting resins may be softened so that they can be easily worked by adding a fatty oil such as tung or linseed oil to the original reaction mixture. This permits them to be washed in boiling water to remove excess catalyst and melted for heat-bleaching and dehydration without danger of their becoming overheated in local areas which would lead to charring and discoloration.

The varnish made from the resins may be used alone or may be blended with other types of varnish. The resin may be first fused with some natural resin such as rosin or copal before it is cooked with drying oils. This method also provides a means of lowering the melting point of the high-melting resins, although it is not desirable to adulterate them by fusion with natural resin, since this tends to detract from their excellent properties of water, acid and alkali resistance.

The varnishes made from the resins may be thinned with any suitable solvent such as turpentine, xylol, V. M. & P. naphtha, or hydrosolvents, such as that known to the trade as Solvesso, or any mixture of solvents.

To recapitulate, the process of the present invention comprises reacting a simple phenol such as cresol, cresylic acid and the like with acetaldehyde, or its polymers, for instance paraldehyde or metaldehyde, in the presence of a bleaching-catalyst capable of causing heat-bleaching and a strong inherently color-forming auxiliary-catalyst, preferably hydrochloric acid, to form a light-colored, high-melting, oil-soluble resin.

In the appended claims when acetaldehyde is referred to the term is meant to include besides monomeric acetaldehyde, the polymers of acetaldehyde such as paraldehyde, metaldehyde and the like.

What I claim is:

1. A process of making phenolic-acetaldehyde resin comprising reacting cresol with acetaldehyde in the presence of oxalic acid and an inherently color-forming strong acid catalyst until a substantially dark-colored resin is formed, heating said dark-colored resin above 180° C. until a substantially light-colored resin results, said light-colored resin being characterized by its ability to become infusible when baked in a thin film at 170° C.

2. A process of making phenolic-acetaldehyde resin comprising reacting cresol with acetaldehyde in the presence of oxalic and hydrochloric acid until a relatively dark-colored resin is formed, heating said dark-colored resin above 180° C. whereupon a substantially light-colored resin results, said light-colored resin being soluble in drying oils and having a softening point above 130° C.

3. A process of making phenolic-acetaldehyde resin comprising reacting cresylic acid with acetaldehyde in the presence of oxalic and hydrochloric acid until a relatively dark-colored resin is formed, heating said dark-colored resin above 180° C. whereupon heat-bleaching occurs yielding a substantially light-colored resin.

4. Resin made in accordance with the process of claim 1.

5. Resin made in accordance with the process of claim 2.

6. Resin made in accordance with the process of claim 3.

7. Phenolic-acetaldehyde resin comprising the reaction product of cresol and acetaldehyde made in the presence of oxalic acid and an inherently color-forming auxiliary strong acid catalyst, and heat-bleached by heating the initial relatively dark-colored resin above 180° C. until a substantially light-colored resin is formed.

8. Light-colored, relatively high-melting phenolic-acetaldehyde resin comprising the reaction product of cresylic acid and acetaldehyde made in the presence of oxalic and hydrochloric acid, the initial substantially dark-colored resin being heated above 180° C.

9. A composition comprising a mixture of drying oil and a phenolic-acetaldehyde resin, said resin comprising the reaction product of cresol and acetaldehyde made in the presence of oxalic acid and an inherently color-forming auxiliary strong acid catalyst and heat-bleached by heating the initial substantially dark-colored resin above 180° C. until a substantially light-colored resin is formed.

10. A composition comprising a mixture of drying oil and a light-colored phenolic-acetaldehyde resin, said resin comprising the reaction product of cresylic acid and acetaldehyde made in the presence of oxalic and hydrochloric acid and heat-bleached by heating the initial relatively dark-colored resin above 180° C.

11. A composition comprising a mixture of drying oil and the phenolic-acetaldehyde resin of claim 4.

12. A composition comprising a mixture of drying oil and the phenolic-acetaldehyde resin of claim 5.

13. A composition comprising a mixture of drying oil and the phenolic-acetaldehyde resin of claim 6.

14. Phenolic-acetaldehyde resin comprising the reaction product of cresol and acetaldehyde made in the presence of an oxalate and an inherently color-forming strong acid catalyst, and heat-bleached by heating the initial relatively dark-colored resin above 180° C. until a substantially light-colored resin is formed.

15. A composition comprising a mixture of drying oil and the phenolic-acetaldehyde resin of claim 14.

16. A process of making phenolic-acetaldehyde resin comprising reacting a dicresylolbutane with acetaldehyde in the presence of oxalic acid and an inherently color-forming strong acid catalyst until a substantially dark-colored resin is formed, heating said dark-colored resin above 180° C. until a substantially light-colored resin results.

17. A process of making phenolic-acetaldehyde resin comprising reacting a diphenylol substituted hydrocarbon with acetaldehyde in the presence of oxalic acid and an inherently color-forming strong acid catalyst until a substantially dark-colored resin is formed, heating said dark-colored resin above 180° C. until a substantially light-colored resin results.

18. Resin made in accordance with the process of claim 16.

19. A composition comprising a mixture of drying oil and the resin of claim 18.

20. The process of making phenolic-acetaldehyde resin comprising reacting a phenol of the class consisting of cresol, cresylic acid and dicresylolbutane with acetaldehyde in the presence of oxalic acid and an inherently color forming strong acid catalyst until a substantially dark colored resin is formed, heating said dark-colored resin above 180° C. until a substantially light-colored resin results.

JOHN B. RUST.